May 24, 1932.  M. F. SULLIVAN  1,859,347
GEARLESS SHIFT AND FREEWHEEL CONSTRUCTION FOR VEHICLES
Filed May 20, 1931  2 Sheets-Sheet 1
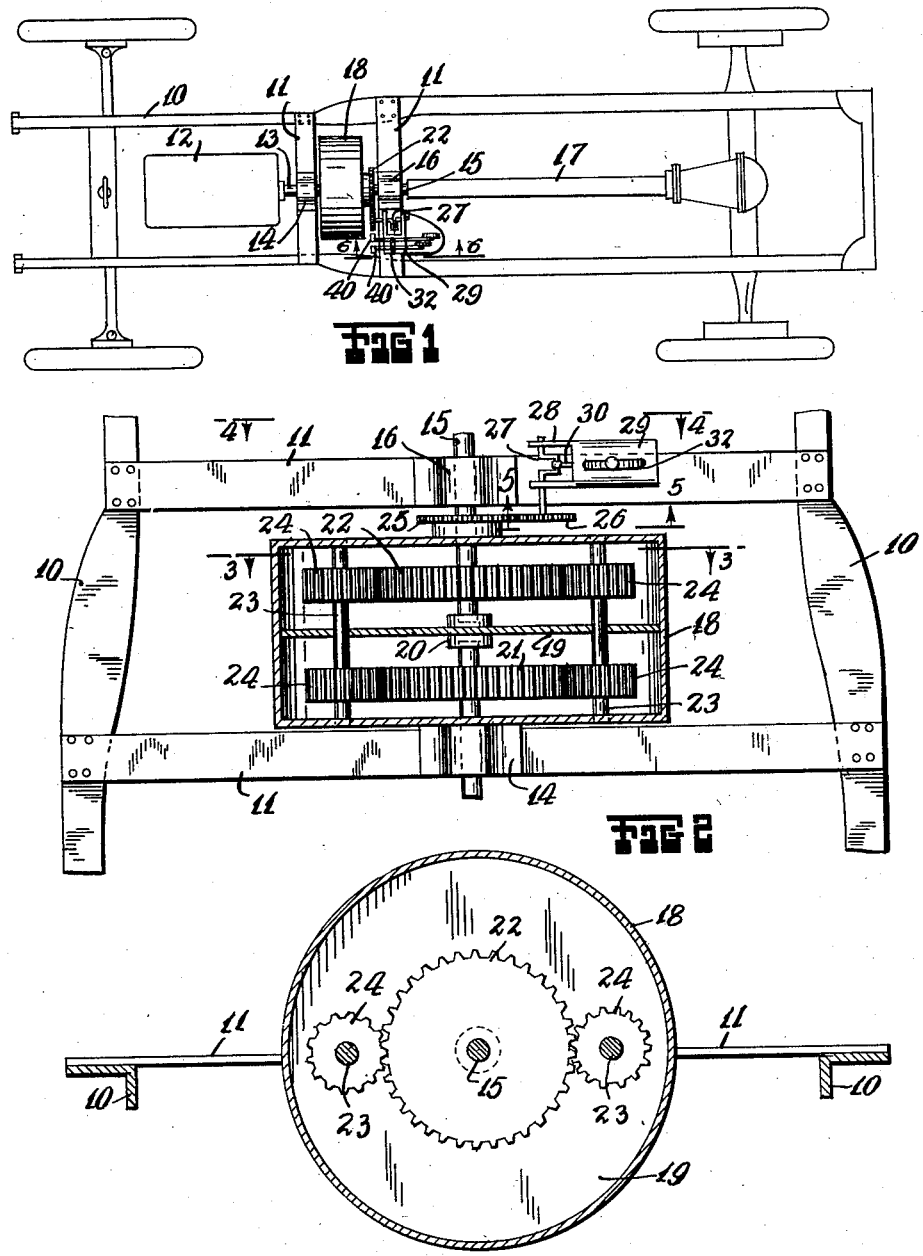
INVENTOR
Michael Francis Sullivan
BY
ATTORNEY May 24, 1932.　　　M. F. SULLIVAN　　　1,859,347
GEARLESS SHIFT AND FREEWHEEL CONSTRUCTION FOR VEHICLES
Filed May 20, 1931　　2 Sheets-Sheet 2
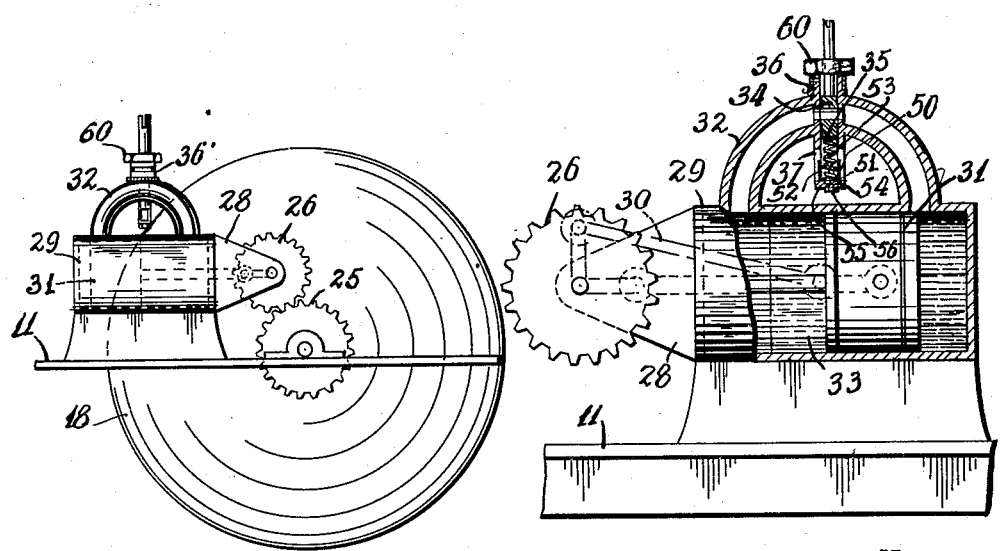
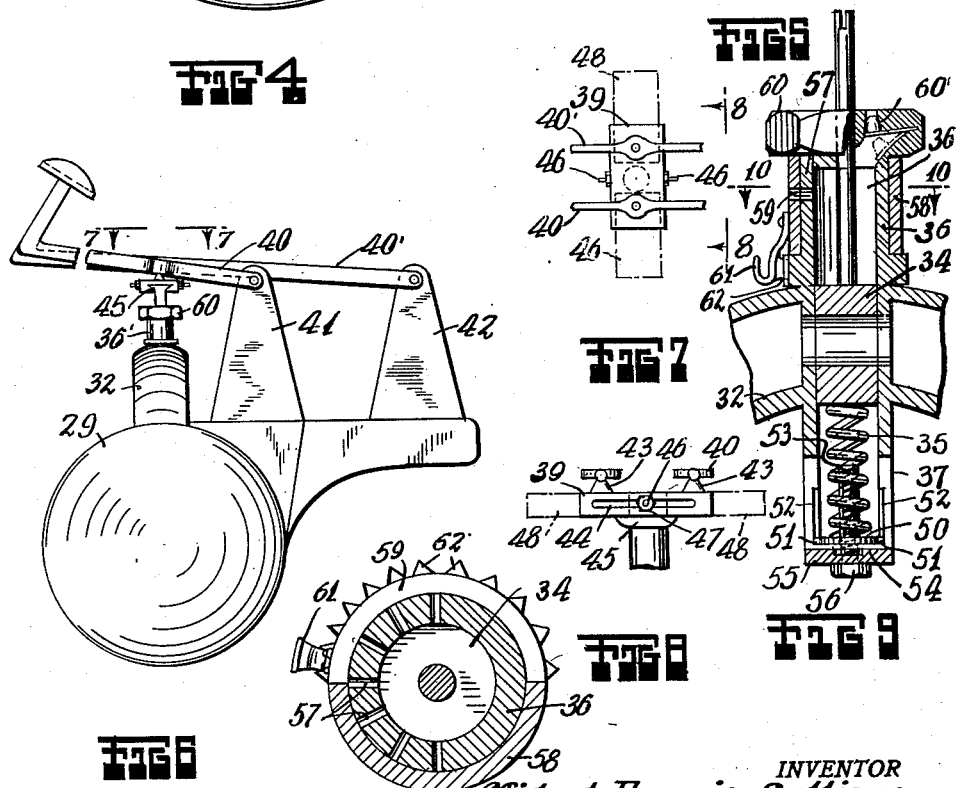
INVENTOR
Michael Francis Sullivan
BY
ATTORNEY Patented May 24, 1932

1,859,347

UNITED STATES PATENT OFFICE

MICHAEL FRANCIS SULLIVAN, OF NEW YORK, N. Y.

GEARLESS SHIFT AND FREEWHEEL CONSTRUCTION FOR VEHICLES

Application filed May 20, 1931. Serial No. 538,747.

This invention relates to new and useful improvements in a gearless shift and free wheel construction for automobiles and the like.

The invention has for an object the construction of a gearless shift which is characterized by a planetary transmission element forming a connection between a driving and a driven element, and a foot pedal controlled resistance connected with the planetary transmission element.

A still further object of this invention is to construct a planetary transmission element in the form of a drum having a transverse partition dividing it into two sections for housing of the gears whereby the bearing for the gears may be disposed in the partition as well as in the sides of the drum.

A still further object of this invention is to support the gearless shift upon the chassis of the vehicle by the provision of support elements carrying bearings through which the driving and the driven element extends.

A still further object of this invention is to construct the foot pedal controlled resistance in the form of a cylinder having a piston and a bypass controlled by a pedal operated valve.

An important and most prominent object of this invention is the provision of adjustable means to control the acceleration of the planetary intermission element as the resistance is decreased. More particularly, it is proposed to provide an adjustable spring for automatically returning certain parts into initial positions upon release of the foot pedal.

A still further object of this invention is to arrange an adjustable plate upon the plunger upon the pedal controlled valve and to provide two pedals of different mechanical advantages so that either one of the pedals may operate the plunger to effect a change in the resistance.

A still further object of this invention is the construction of a gearless shift which is of simple, durable construction, desirable in use and efficient in action, and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings, forming a material part of this disclosure:—

Fig. 1 is a plan view of an automobile chassis provided with a gearless shift constructed according to this invention.

Fig. 2 is a horizontal sectional view of the gearless shift.

Fig. 3 is a sectional view taken on the line 3—3 of Fig. 2.

Fig. 4 is an elevational view looking in the direction of the line 4—4 of Fig. 2.

Fig. 5 is an enlarged detailed sectional view of the valve controlled resistance.

Fig. 6 is an enlarged elevational view looking in the direction of the line 6—6 of Fig. 1.

Fig. 7 is a fragmentary enlarged elevational view looking in the direction of the line 7—7 of Fig. 6.

Fig. 8 is an elevational view looking in the direction of the line 8—8 of Fig. 7.

Fig. 9 is an enlarged sectional detailed view of the valve construction shown in Fig. 5.

Fig. 10 is a sectional view taken on the line 10—10 of Fig. 9.

The gearless shift, according to this invention, is shown applied upon the chassis 10 of a motor vehicle. A pair of spaced transverse straps 11 are parallel to each other and connect at their ends upon the side members of the chassis. The driving shaft 13 from the motor 12 on the vehicle extends into a bearing 14 upon one of the straps 11. A driven shaft 15 extends through a bearing 16 upon the other strap 11 and connects with the transmission shaft 17 of the vehicle.

A planetary drum 18 is rotatively mounted with its axis coaxial with the shafts 11 and 15 which in turn are in alignment with each other. A transverse partition 19 is extended across the inside of the planetary drum 18 and serves to divide it into two sections for housing planetary gears. A bearing 20 is mounted in the partition 19 for receiving the ends of the driver shaft 12 and the driven shaft 15. While these shafts extend into the same bearing they are not connected with each other. A large gear 21 is fixed upon the shaft 12 within one of the sections of the drum and another large gear 22 is fixed upon the driven shaft within the other section of the drum.

A pair of shafts 23 upon a diameter of the drum extend longitudinally through the drum 18 and are rotatively mounted. The rotative mounting may be accomplished by using the side walls and the partition 19 as bearings for the shafts. Small, planetary gears 24 are mounted on the shafts 23 and are in mesh with the gears 21 and 22. The gears 24 are diametrically opposite each other as may be seen from inspecting Fig. 3.

A gear 25 is rigidly attached upon the side of the planetary drum 18 and is freely mounted upon the shaft 15. This gear connects up with the resistance in the form of a gear 26 in mesh therewith and upon a crank shaft 27 rotatively mounted in standards 28 from a cylinder 29. This cylinder is mounted upon one of the transverse straps 11. A connecting rod 30 connects with the crank and with a piston 31 within the cylinders. A bypass pipe 32 connects the opposite ends of the cylinder to allow a liquid 33 which completely fills the cylinder to pass to opposite sides of the piston. A slide valve 34 is mounted upon the bypass 32 and is normally urged into an open position by a spring 35. The bypass 32 is provided with a valve body portion 36 through which the valve 34 slidably passes. Also, the bypass 32 is provided with an open extension portion 37 in which the spring 35 is disposed.

The spring 35 is adjustable for the purpose of extending the valve 34 back into its initial condition at various speeds. The adjustment is accomplished by a disc 50 longitudinally slidable within the body portion 37 by reason of having lugs 51 engaging longitudinal internal grooves 52. A threaded member 53 is provided with a flange 54 rotatively supported by a body member 55 which is attached upon the end of the body 37. The stud 53 has a threaded portion which threadedly engages through the disc 50 and has an external head 56 so that it may be manually turned. Upon turning of the head 56, the disc 50 will be moved to various positions and hold the spring 35 at various tensions. Consequently, after the valve 34 is depressed for adding resistance to cause the drum 18 to stop or slow down in its motion, and then the valve is released, the tension of the spring 35 will determine the length of time that it takes the valve to assume its original position. The original position is the one in which no resistance is offered so that the drum 15 is free to rotate at maximum capacity.

Instead of controlling the action of valve 34 by tensioning spring 35, a dash pot arrangement 36' is provided over the valve 34 to produce a controlled retarding action. The dash pot 36' consists of a plurality of apertures 57 formed in the body portion 36, and a rotary sleeve 58 around the said valve body portion 36 which has an annular groove 59. A portion of this annular groove 59 may be placed in alignment with apertures 57 by rotating the sleeve 58. A hexagon head 60 is provided with a one way valve 60' to allow air to fill the valve body portion 36 when the plunger valve 34 is depressed. A spring 61 engages peripheral teeth 62 on the valve body 36 in order to keep the sleeve 58 in the set position.

The dash pot arrangement may be used independently from the spring adjustment for controlling the length of time during which the valve assumes its original position after the foot pedal is released. If it is desired to increase the length of time for returning the valve 34 to normal position, sleeve 58 is so rotated as to have only a limited number of apertures in alignment with the annular groove 59. This adjustment will start the car at a slower rate than if all the apertures 57 are in alignment with the annular groove 59.

An adjustable member 39 is mounted upon the extended end of the plunger of the valve 34 and in the path of motion of foot pedals 40 and 40' respectively. These pedals are pivotally mounted upon standards 41 and 42 located at different distances from the valve. The pedals extend over across the top of the adjustable member 39. Pegs 43 upon the adjustable member 39 form bearing points whereon the foot pedals may bear. Slots 44 are formed in the sides of the member 39 which has in its bottom a dove-tailed groove engaging upon a dove-tailed tongue 45 on the plunger valve 34. Studs 46 project from the tongue 45 through the slots 44 and lock nuts 47 upon the studs serve to clamp the adjustable member 39 as desired. This member may be moved one way or the other as indicated by the dot and dash lines 48 so as to be out of the path of motion of one or the other of the bell cranks 40, 40'.

In operation, the driver of the vehicle can operate the vehicle without the necessity of shifting. Normally, the spring 35 urges the plunger so that the valve 34 is open to allow passage of the liquid from one side to the other side of the piston 31. Then the gear 26 is free to rotate and does not offer any resistance to the operation of the drum 18. Consequently, as the motor 12 operates, its shaft 13 will rotate the gear 21 which will cause the pinions 24 to move along and the drum 18 will rotate at the same speed as the driver shaft 12. Consequently, no rotation will be imparted to the shaft 15 and the automobile will be at a stand still.

The operator of the vehicle may depress one or the other of the foot pedals, 40, 40' so as to close the valve 34 to any desired degree. This will cause resistance to the travel of liquid from one side to the other side of the piston, which resistance will hold the drum 18 to various degrees so that its speed of rotation is cut down as desired. Consequently, some of the rotations from the driver shaft 12 will cause turning of the gears 24 and corresponding rotation of the driven shaft 15. In this manner, the speed of the automobile can be controlled.

When the driver wishes a sensitive control of the car, he operates the foot pedal 40 wherein large movements of the pedal are reduced down to small movements of the plunger valve. When the control of the car is not to be as fine, the operator operates the pedal 40'. When it is so desired, the adjustable member 39 may be moved to one or the other of the adjustable positions indicated by the dot and dash lines 48 so that one or the other of the foot pedals 40, 40' may be used exclusively. This will necessitate the driver of the car to use the specific pedal.

The acceleration under which the drum 18 moves to its full speed condition, is controlled by the action of the spring 35. When the spring is adjusted to various tensions as allowed by the stud 53, it will be capable of returning the valve 34 back to its initial condition in various predetermined intervals of time. It should be borne in mind that as the pedal is depressed for closing the valve 34, resistance is built up which causes a slowing down of the rotations of the drum 18 and a consequent transmission of rotations from the driver shaft to the driven shaft. Then, when the pedal is released, the deceleration of the driven shaft will bear a direct relation to the tension of the spring 35.

The advantage of the partition 19 within the drum 18 resides in the fact that it forms a sturdy support for bearings of the shaft 12 and of the shaft 15. Also, the partition forms a support for the shafts 23.

A gearless shift and free wheel construction for vehicles, constructed according to this invention makes it possible to automatically control the acceleration of a car from starting position to maximum speed by removing one's foot from the foot pedal which engages the controlling valve. In addition, the customary foot pedal may be used for applying the brakes of a car. These pedals will eliminate the use of shift gears and provide effective control of wide scope.

It is to be understood that the foot pedal controlled resistance may be of any piston and cylinder arrangement as long as the by-pass is controlled by a suitable pedal operated valve.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A gearless shift and free wheel construction for automobiles and the like, comprising a driving element, a driven element for connection with the transmission of the vehicle, a planetary transmission element forming a connection between the driving and the driven element and having a drum, a resistance connected with the planetary transmission element, foot pedal means for varying said resistance from substantially zero to an amount sufficient to hold said drum against turning upon depression of the foot pedal, and adjustable means for automatically controlling the acceleration of said drum upon release of the foot pedal, comprising a dash pot adapted to retard the acceleration of said drum, said dash pot consisting of a main valve body, a valve, apertures in said valve body, a sleeve around the valve body and a groove in said sleeve, a means for locking the said sleeve in adjusted position, comprising peripheral teeth formed on the valve body, and means on the sleeve engaging said teeth.

2. A gearless shift and free wheel construction for automobiles and the like, comprising a driving element, a driven element for connection with the transmission of the vehicle, a planetary transmission element forming a connection between the driving and the driven element and having a drum, a resistance connected with the planetary transmission element, foot pedal means for varying said resistance from substantially zero to an amount sufficient to hold said drum against turning upon depression of the foot pedal, and adjustable means for automatically controlling the acceleration of said drum upon release of the foot pedal, comprising a dash pot adapted to retard the acceleration of said drum, said dash pot consisting of a main valve body, a valve, apertures in said valve body, a sleeve around the valve body and a groove in said sleeve, a means for locking the said sleeves in adjusted position, comprising peripheral teeth formed on the valve body, and means on the sleeve engaging said teeth, comprising a spring fixed on the sleeve.

3. A gearless shift for automobiles and the like, comprising a planetary transmission element imposed between a driving and driven element and a foot pedal controlled resistance connected with the planetary transmission element, comprising a cylinder with a controlling bypass, a valve within the bypass and operated by a plunger, an adjustable member on said plunger, and a pair of pedals with different mechanical advantages selectively engageable against said adjustable member in one position of the adjustable member and individually engageable in another position.

4. A gearless shift and free wheel construction for automobiles and the like, comprising a driving element, a driven element for connection with the transmission of the vehicle, a planetary transmission element forming a connection between the driving and the driven element and having a drum, a resistance connected with the planetary transmission element, foot pedal means for varying said resistance from substantially zero to an amount sufficient to hold said drum against turning upon depression of the foot pedal, and adjustable means for controlling the acceleration of said drum upon release of the foot pedal, comprising resilient means for reducing the resistance, and a control for adjusting the resiliency of said resilient means.

5. A gearless shift and free wheel construction for automobiles and the like, comprising a driving element, a driven element for connection with the transmission of the vehicle, a planetary transmission element forming a connection between the driving and the driven element and having a drum, a resistance connected with the planetary transmission element, foot pedal means for varying said resistance from substantially zero to an amount sufficient to hold said drum against turning upon depression of the foot pedal, and adjustable means for controlling the acceleration of said drum upon release of the foot pedal, comprising resilient means for reducing the resistance, and a control for adjusting the resiliency of said resilient means, comprising a rotatively mounted stud connected with a longitudinal adjustment disc engaging against one end of the resilient element of the resilient means.

6. A gearless shift and free wheel construction for automobiles and the like, comprising a driving element, a driven element for connection with the transmission of the vehicle, a planetary transmission element forming a connection between the driving and the driven element and having a drum, a resistance connected with the planetary transmission element, foot pedal means for varying said resistance from substantially zero to an amount sufficient to hold said drum against turning upon depression of the foot pedal, and adjustable means for automatically controlling the acceleration of said drum upon release of the foot pedal, comprising a dash pot adapted to retard the acceleration of said drum.

7. A gearless shift and free wheel construction for automobiles and the like, comprising a driving element, a driven element for connection with the transmission of the vehicle, a planetary transmission element forming a connection between the driving and the driven element and having a drum, a resistance connected with the planetary transmission element, foot pedal means for varying said resistance from substantially zero to an amount sufficient to hold said drum against turning upon depression of the foot pedal, and adjustable means for automatically controlling the acceleration of said drum upon release of the foot pedal, comprising a dash pot adapted to retard the acceleration of said drum, said dash pot consists of a main valve body, a valve, apertures in said valve body, a sleeve around a rotary valve body and a groove in said sleeve.

8. A gearless shift and free wheel construction for automobiles and the like, comprising a driving element, a driven element for connection with the transmission of the vehicle, a planetary transmission element forming a connection between the driving and the driven element and having a drum, a resistance connected with the planetary transmission element, foot pedal means for varying said resistance from substantially zero to an amount sufficient to hold said drum against turning upon depression of the foot pedal, and adjustable means for automatically controlling the acceleration of said drum upon release of the foot pedal, comprising a dash pot adapted to retard the acceleration of said drum, said dash pot consists of a main valve body, a valve, apertures in said valve body, a sleeve around a rotary valve body and a groove in said sleeve, a means for locking the said rotary in adjusted position.

9. A gearless shift and free wheel construction for automobiles and the like, comprising a driving element, a driven element for connection with the transmission of the vehicle, a planetary transmission element forming a connection between the driving and the driven element and having a drum, a resistance connected with the planetary transmission element, foot pedal means for varying said resistance from substantially zero to an amount sufficient to hold said drum against turning upon depression of the foot pedal, and adjustable means for automatically controlling the acceleration of said drum upon release of the foot pedal, comprising a dash pot adapted to retard the acceleration of said drum, said dash pot consists of a main valve body, a valve, apertures in said valve body, a sleeve around a rotary valve body and a groove in said sleeve, a means for locking the said rotary in adjusted position, an auxiliary means for reducing the resistance comprising a resilient member, and a control for adjusting the resiliency of the said resilient means.

10. A gearless shift and free wheel construction for automobiles and the like, comprising a driving element, a driven element for connection with the transmission of the vehicle, a planetary transmission element forming a connection between the driving and the driven element and having a drum, a resistance connected with the planetary transmission element, foot pedal means for varying said resistance from substantially zero to an amount sufficient to hold said drum against turning upon depression of the foot pedal, and adjustable means for automatically controlling the acceleration of said drum upon release of the foot pedal, comprising a dash pot adapted to retard the acceleration of said drum, said dash pot consists of a main valve body, a valve, apertures in said valve body, a sleeve around a rotary valve body and a groove in said sleeve, a means for locking the said rotary in adjusted position, an auxiliary means for reducing the resistance comprising a resilient member, and a control for adjusting the resiliency of the said resilient means, said auxiliary means is located on one side of said valve, opposite the said dash pot.

In testimony whereof I have affixed my signature.

MICHAEL FRANCIS SULLIVAN.